July 31, 1923. 1,463,429
M. D. LOGAN
TIRE SHOE
Filed Jan. 23, 1923
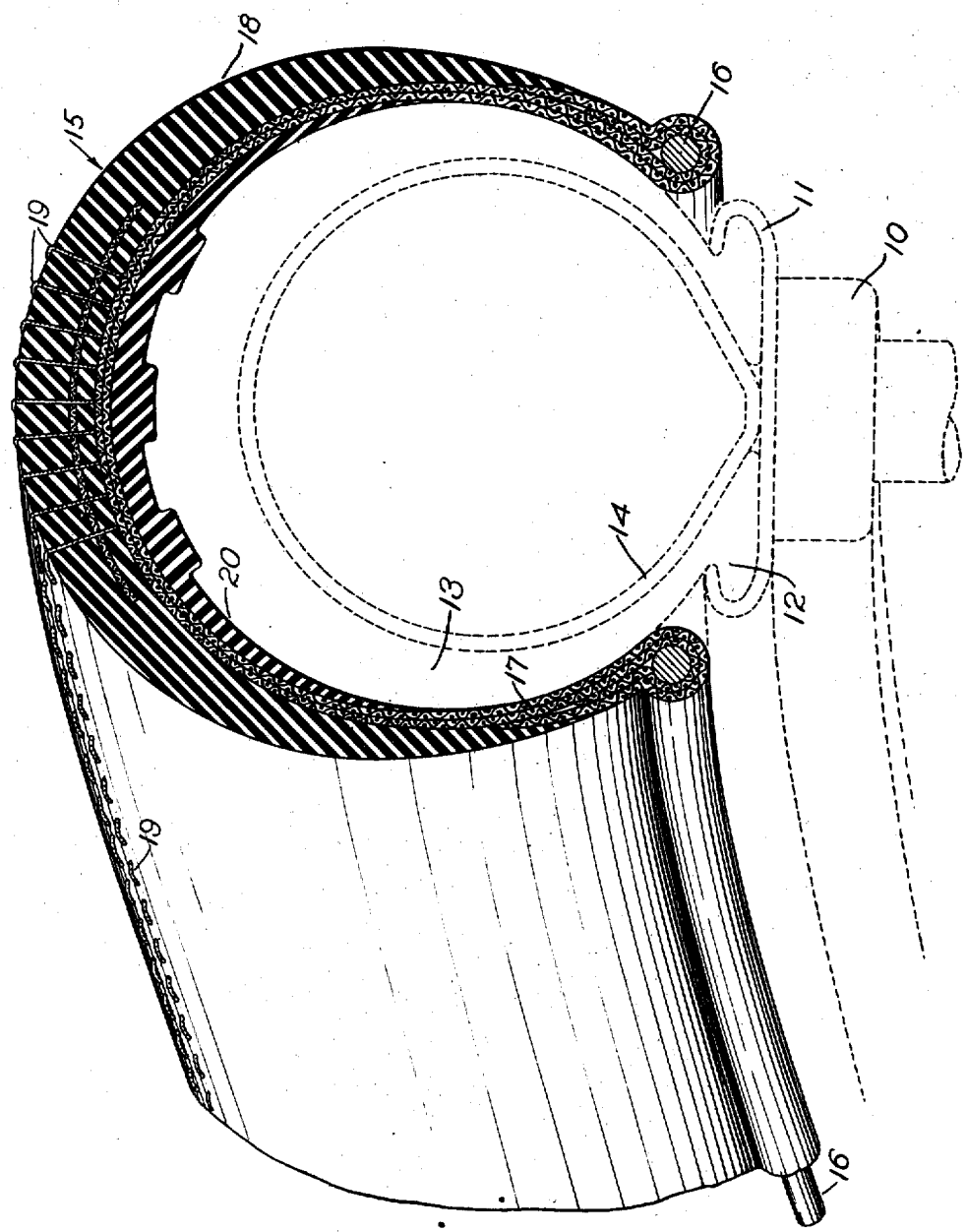
INVENTOR.
MALCOLM D. LOGAN.
BY Chas. E. Townsend
ATTORNEY.

Patented July 31, 1923.

1,463,429

UNITED STATES PATENT OFFICE.

MALCOLM D. LOGAN, OF LOS ANGELES, CALIFORNIA.

TIRE SHOE.

Application filed January 23, 1923. Serial No. 614,505.

*To all whom it may concern:*

Be it known that I, MALCOLM D. LOGAN, a citizen of the United States, residing at Los Angeles, county of Los Angeles, and State of California, have invented new and useful Improvements in Tire Shoes, of which the following is a specification.

This invention relates to a pneumatic tire and particularly pertains to an overshoe therefor.

It is the principal object of the present invention to provide an overshoe for the outer casings of pneumatic tires, which will completely enclose the tire and serve as an armored casing therefor, at the same time securely gripping the tire and adhering thereto in a manner to prevent lateral or circumferential relative movement between the tire casing and the overshoe.

The present invention contemplates the use of a casing structure preferably formed of rubber and fabric, which structure is substantially crescent-shaped in section and is adapted to completely embrace the outer casing of a pneumatic tire, in order to cover this casing from one tire rim to the other, said casing being suitably reinforced and braced in a manner to be firmly held against the tire casing and at the same time provided with an inner portion adapted to cause the overshoe and casing to remain in fixed relation to each other, allowing the inner portion of the overshoe to conform to irregularities and cavities in the contour of the tire casing, the tread portion of said overshoe being longitudinally reinforced with fabric stitching to prevent wear and slip or skidding. The invention is illustrated by way of example in the accompanying drawings, in which:

The figure is a fragmentary view in perspective showing a portion of the overshoe in side elevation and a transverse section of the tire with the overshoe applied.

Referring more particularly to the drawings, 10 indicates a wheel felly upon which is mounted a tire rim 11. As here indicated, this rim is of the clincher type and is adapted to receive clincher beads 12 of a pneumatic tire casing 13. The casing encloses a tire tube 14. It will be understood that the tire may be of any preferred design and that the present invention is more particularly concerned with a protective outer casing or overshoe 15. In section the overshoe and the tire casing are substantially the same formation, thus making it possible to build up a worn tire casing so that it will have the appearance of a new tire. The sides of the overshoe extend down in close proximity to the tire rim 14 and are there reinforced by tension cables 16. These cables may be formed of a plurality of strands of wire if desired or may be metal rods which extend circumferentially of the tire casing. The reinforcing cables 16 are held in the overshoe by fabric strips 17, the ends of which are brought down and are wrapped around the cables, while the body portion of these strips extend completely around and within the overshoe and are vulcanized thereto so that the opposite edges of the fabric are secured to the cables at the opposite sides of the tire, thus placing the tension of the cable directly upon the fabric. A layer of rubber as indicated at 18 is placed over the fabric strips 17 and may be suitably cured so as to have the desired exterior appearance and at the same time to possess sufficient wearing qualities to serve the purpose of an outer tire tread. In order to reinforce the tire tread, fabric stitching 19 is made circumferentially of the overshoe and the threads thereof are intended to pass down therethrough said tread. By this arrangement the ends of the stitching will at all times be exposed and will retard the wearing, slipping and skidding action produced as the tire rolls on its tread surface.

The inner surface of the overshoe is formed with a pliable section 20. This section of material is substantially crescent-shaped having its greatest thickness at the tread. The material from which this section is made is especially compounded rubber or rubber so treated as to permit it to readily conform and adhere to irregularities in the contour in the tread or to the non-skid surface intentionally cast thereon. Due to this the pressure on the tread of the overshoe caused by air pressure or inflation will cause said rubber to be forced into the depressions in the tread of the tire, thus causing these two surfaces to interlock and adhere in a manner to prevent lateral and longitudinal slippage.

In operation of the present invention, it is necessary to first deflate and buckle the tire, thereafter slipping the overshoe therearound and with its reinforcing cable 16 in proper relation to the opposite sides of the tire rim. The tire may then be inflated and as the cable 16 will not permit stretching of the overshoe the outer surface of the tire casing will be completely covered and the inner surface of the overshoe drawn tightly thereagainst. As the tire is used, the section 20 of the overshoe will conform to the outer surface of the tire casing and produce the result previously described.

It will thus be seen that by the use of the tire covering as here disclosed, a tire casing will be properly protected and will be given a neat and attractive appearance closely resembling that of a new or unused tire.

While I have shown the preferred form of my invention as now known to me, it will be understood that various changes in the construction, combination and arrangement of parts may be made by those skilled in the art without departing from the spirit of the invention as claimed.

Having thus described my invention, what I claim and desire to secure by Letters Patent is:

1. An overshoe for pneumatic tire casings formed of alternate layers of rubber and fabric, reinforcing cables around which the opposite sides of the fabric are secured and afterwards embedded and vulcanized within the rubber and fabric and a layer of soft rubber forming the inner face of the tire overshoe and adapted to readily conform and adhere to irregularities in the contour in the tire casing.

2. An overshoe for pneumatic tires formed of layers of rubber and fabric, adapted to conform to the outer circumference of a tire casing, and to extend over the sides thereof, non-yielding reinforcing members extending along the marginal edges of the shoe, thus formed, to hold it in position, and an inner layer of soft plastic rubber within said shoe, adapted to readily and permanently conform to the irregularities in the contour of the casing, and thereby to hold the shoe against circumferential or lateral movement.

3. An overshoe for pneumatic tire casings comprising an outer body portion of rubber substantially crescent-shaped, and extending over the tread and down over the sides of the casing to a point below the transverse sectional center of the casing, and stitched thereto, a fabric breaker strip embedded within the rubber directly below the tread portion of the casing, fabric layer strips, to which the body portion of the shoe is vulcanized, rigid reinforcing rings or wires disposed along the opposite edges of the shoe and along which the fabric strips are wrapped, said strips being thereafter rigid within the rubber of the casing, the tread stitching passing through the breaker strip and into the fabric strips of the shoe, said stitch occuring at intervals throughout the length of the shoe and arranged across the tread portion thereof, and a crescent-shaped layer of plastic rubber within the shoe and adapted to permanently conform to the contour and irregularities of the casing over which the shoe is mounted.

4. An overshoe for pneumatic tire casings formed of alternate layers of rubber and fabric, reinforcing cables around which the opposite ends of the fabric are secured, and afterwards embedded and vulcanized within the rubber; a layer of soft rubber forming the inner face of the overshoe, same being adapted to conform with the irregularities of the tire when the tire is inflated but permitting removal of the overshoe when the tire is deflated.

5. An overshoe for pneumatic tire casings, the same having an inner face of pliable material which is adapted to conform with the irregularities of the tire and prevent movement between the overshoe and the tire when the tire is inflated, but allowing removal of the shoe when the tire is deflated.

MALCOLM D. LOGAN.